(12) United States Patent
Choi

(10) Patent No.: US 11,095,007 B2
(45) Date of Patent: Aug. 17, 2021

(54) APPARATUS FOR BENDING CURRENT BREAKING MEMBER OF BATTERY PACK

(71) Applicant: LG CHEM, LTD., Seoul (KR)

(72) Inventor: Sung-Ho Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 127 days.

(21) Appl. No.: 16/490,860

(22) PCT Filed: Sep. 21, 2018

(86) PCT No.: PCT/KR2018/011332
§ 371 (c)(1),
(2) Date: Sep. 3, 2019

(87) PCT Pub. No.: WO2019/066440
PCT Pub. Date: Apr. 4, 2019

(65) Prior Publication Data
US 2020/0035982 A1    Jan. 30, 2020

(30) Foreign Application Priority Data
Sep. 26, 2017 (KR) .......................... 10-2017-0124421

(51) Int. Cl.
*H01M 50/581* (2021.01)
*H01M 50/531* (2021.01)

(52) U.S. Cl.
CPC ....... *H01M 50/581* (2021.01); *H01M 50/531* (2021.01); *H01M 2200/103* (2013.01)

(58) Field of Classification Search
CPC ........................ H01M 50/581; H01M 50/531
See application file for complete search history.

(56) References Cited

U.S. PATENT DOCUMENTS

| 2004/0096735 A1* | 5/2004 | Komatsu | H01M 50/557 |
| | | | 429/176 |
| 2012/0114987 A1* | 5/2012 | Kogure | H01M 50/10 |
| | | | 429/56 |

(Continued)

FOREIGN PATENT DOCUMENTS

| CN | 106602095 A | 4/2017 |
| CN | 106684422 A | 5/2017 |

(Continued)

OTHER PUBLICATIONS

Machine Translation of: Choo et al., KR 10-2015-0049969, May 8, 2015.*

(Continued)

*Primary Examiner* — Kenneth J Douyette
(74) *Attorney, Agent, or Firm* — Birch, Stewart, Kolasch & Birch LLP

(57) ABSTRACT

In an apparatus for bending a current breaking member of a battery pack, the apparatus includes a bending jig having a support configured so that a current breaking member electrically connected to an electrode lead of a battery cell is placed thereon; a rotation driving unit having a portion connected to the bending jig so that the bending jig rotates based on a rotation axis thereof; and a bending guide unit configured to press and fix the electrode lead so that a bending line dividing a bent portion and a non-bent portion of the electrode lead of the battery cell is set.

14 Claims, 12 Drawing Sheets

(56) References Cited

U.S. PATENT DOCUMENTS

| | | |
|---|---|---|
| 2013/0040170 A1 | 2/2013 | Choi et al. |
| 2013/0295430 A1* | 11/2013 | Kurahashi ............ H01M 50/528 |
| | | 429/120 |
| 2015/0004440 A1 | 1/2015 | Hwang |

FOREIGN PATENT DOCUMENTS

| | | |
|---|---|---|
| JP | 9-29338 A | 2/1997 |
| JP | 2000-331669 A | 11/2000 |
| JP | 2001-143743 A | 5/2001 |
| JP | 2001-160389 A | 6/2001 |
| JP | 2002-343317 A | 11/2002 |
| JP | 2013-41810 A | 2/2013 |
| KR | 10-2006-0027251 A | 3/2006 |
| KR | 10-2015-0002138 A | 1/2015 |
| KR | 10-2015-0049969 A | 5/2015 |
| KR | 10-2015-0055790 A | 5/2015 |
| KR | 10-2015-0141810 A | 12/2015 |
| KR | 10-2016-0104433 A | 9/2016 |
| KR | 10-1659120 B1 | 9/2016 |
| KR | 10-2017-0089276 A | 8/2017 |

OTHER PUBLICATIONS

European Search Report for Appl. No. 18863102.2 dated May 26, 2020.
International Search Report for PCT/KR2018/011332 (PCT/ISA/210) dated Apr. 26, 2019, with English translation.

* cited by examiner (a)

(b)

(a)

(b)

APPARATUS FOR BENDING CURRENT BREAKING MEMBER OF BATTERY PACK

TECHNICAL FIELD

The present disclosure relates to an apparatus for bending a current breaking member of a battery pack, which is used for manufacturing a battery pack, and more particularly, to an apparatus for bending a current breaking member of a battery pack, which secures product uniformity and reduces manufacture costs by automating the bending process of the current breaking member.

The present application claims priority to Korean Patent Application No. 10-2017-0124421 filed on Sep. 26, 2017 in the Republic of Korea, the disclosures of which are incorporated herein by reference.

BACKGROUND ART

As the use of portable electric products such as video cameras, cellular telephones and portable PCs becomes more active, the importance of secondary batteries, which are mainly used as driving power sources thereof, is increasing.

Unlike primary batteries that are not able to be charged, secondary batteries capable of being charged and discharged are being actively studied due to the development of advanced fields such as digital cameras, cellular phones, laptop computers, power tools, electric bicycles, electric vehicles, hybrid electric vehicles and large-capacity power storage systems.

In particular, a lithium secondary battery is being used actively since it has a higher energy density per unit weight and allows rapid charging compared to other secondary batteries such as lead storage batteries, nickel-cadmium batteries, nickel-hydrogen batteries and nickel-zinc batteries.

The lithium secondary battery has an operation voltage of 3.6V or higher and is used as a power source for portable electronic devices. In addition, a plurality of batteries may be connected in series or in parallel and used for high-output electric vehicles, hybrid electric vehicles, power tools, electric bicycles, power storage systems and UPS.

The lithium secondary battery is being propagated vary rapidly since it has an operation voltage three times higher than the nickel-cadmium battery or the nickel-metal hydride battery and also has an excellent energy density per unit weight.

The lithium secondary battery may be classified into a lithium ion battery using a liquid electrolyte and a lithium ion polymer battery using a polymer solid electrolyte, depending on the electrolyte type. In addition, the lithium ion polymer battery may be classified into a lull solid lithium ion polymer battery containing no electrolytic solution and a lithium ion polymer battery using a gel-type polymer electrolyte containing an electrolytic solution, depending on the type of the polymer solid electrolyte.

In the case of a lithium ion battery using a liquid electrolyte, a metal can usually having a cylinder or rectangular shape is used as a container in a welded and sealed state. The can-type secondary battery using the metal can as a container has a fixed shape, and thus the design of an electric product using the -type secondary battery as an electric power may be restricted, and it is difficult to reduce the volume. Thus, a pouch-type secondary battery in which an electrode assembly and an electrolyte are accommodated and sealed in a pouch package made of films has been developed and used.

However, the lithium secondary battery may be exploded when being overheated, so it is important to secure safety. The overheating of the lithium secondary battery may be caused by several factors, one of which is the overcurrent over the limit through the lithium secondary battery.

When an overcurrent flows, the secondary battery is heated due to the joule heat, and the internal temperature of the battery rises rapidly. Also, the rapid rise in temperature causes a decomposition reaction of the electrolytic solution, resulting in a thermal runaway, which eventually leads to the explosion of the battery.

Thus, the lithium secondary battery may include a current breaking member to protect the battery when an overcurrent or an overheating phenomenon occurs. The current breaking member may be, for example, an overvoltage protecting element, a thermal cut off (TCO) or the like.

The current breaking member generally includes a fuse element that irreversibly disconnects a line through which a charge current or discharge current flows, when overcurrent or overheating occurs.

However, in the prior art, when the current breaking member is installed to the pouch-type battery cell, and the current breaking member is commonly installed manually by a skilled worker. As a result, the completeness of the installation work is changed according to the condition of the worker. Thus, it is difficult to produce uniform-quality products, and the customer satisfaction is lowered due to a high defect rate.

Further, since the process of installing the current breaking member is a dangerous process that may lead to explosion of the battery cell if a short circuit occurs between the current breaking member and other components of the battery cell that generate electricity, the working environment of the worker is not safe, and the installing work is very difficult. For this reason, a skilled worker is indispensable. Accordingly, the process of installing the current breaking member may cause a bottleneck phenomenon in the entire battery pack manufacturing procedure, thereby increasing the manufacture cost.

DISCLOSURE

Technical Problem

The present disclosure is designed to solve the problems of the related art, and therefore the present disclosure is directed to providing an apparatus for bending a current breaking member of a battery pack, which may secure product uniformity and reduce manufacture costs by automating the bending process of the current breaking member.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an apparatus for bending a current breaking member of a battery pack, comprising:

a bending jig having, a support on which a current breaking member electrically connected to an electrode lead of a battery cell is placed;

a rotation driving unit having a portion connected to the bending jig so that the bending jig rotates based on a rotation axis thereof; and a bending guide unit configured to press and fix the electrode lead so that a bending line dividing a bent portion and a non-bent portion of the electrode lead of the battery cell is set.

Here, the bending guide unit may include a guide bar whose one end presses and fixes the electrode lead to set the bending line.

Also, an edge structure oriented in parallel to the rotation axis may be formed at the one end of the guide bar.

Moreover, the bending guide unit may include a guide carrying device for carrying the guide bar so that the one end of the guide bar presses and fixes the electrode lead.

In addition, the guide carrying device may be configured so that the one end of the guide bar approaches a surface of the electrode lead in a diagonal direction.

Further, the rotation driving unit may rotate the bending jig so that the current breaking member is bent and rotated based on the bending line of the electrode lead and then placed on an upper surface of a terrace portion of the battery cell.

Also, the rotation driving unit may primarily rotate the bending jig by a partial angle of 180 degrees in total based on the rotation axis and secondarily rotate the bending jig by the remaining angle.

Moreover, the rotation driving unit may include a rotation bar connected to a rotary shaft to transmit a rotating force to the bending jig.

In addition, the rotation bar may include a main body formed to extend from the rotary shaft in a direction along which a centrifugal force is applied and a bent extension bent from an extending end of the main body and extending in a longitudinal direction of the rotary shaft.

Further, a portion of the bent extension and a lower portion of the bending jig may be coupled to each other.

Meanwhile, the apparatus for bending a current breaking member of a battery pack may further comprise a battery cell supply unit having a placing jig on which the battery cell is mounted and a jig carrying device for carrying the placing jig so that the current breaking member is located on the support of the bending jig; and a compression fixing unit having a pressing block configured to compress the electrode lead bent along the bending line.

Also, the placing jig may have at least one alignment block formed to press a side surface of the placed battery cell so that the battery cell is aligned to a given location.

Moreover, the battery cell may be placed on the placing jig so that a portion of the current breaking member protrudes out of an outer circumference of the placing jig.

In addition, the placing jig of the battery cell supply unit may include a recessed groove having an inwardly concave structure so that a portion of the current breaking member is inserted therein.

Further, the support of the bending jig may include a supporting portion formed to ridge upward from an upper surface of the bending jig; and a protruding portion formed by protruding a portion of the supporting portion toward the battery cell.

Also, the protruding portion may be located to be inserted into the recessed groove.

In addition, the compression fixing unit may include a pressing carrying device configured so that the pressing block presses an upper surface of the bent electrode lead and returns an original position again.

Moreover, in another aspect of the present disclosure, a method for manufacturing a battery pack may use the apparatus for bending a current breaking member of a battery pack according to the present disclosure.

Also, the method may comprise:

(a) by the battery cell supply unit, carrying and supplying a battery cell so that the current breaking member is located on the support of the bending jig;

(b) by the bending guide unit, pressing and fixing an upper surface of the electrode lead so that a bending line is set on the electrode lead connected to the current breaking member;

(c) by the rotation driving unit, rotating the bending jig based on the rotation axis so that the current breaking member placed on the support is rotated; and (d) by the compression fixing unit, compressing the bent electrode lead downward.

Moreover, in the step (c), the bending jig may be primarily rotated by a partial angle of 180 degrees in total based on the rotation axis and then secondarily rotated by the remaining angle after the bending guide unit returns to an original position.

Advantageous Effects

According to an embodiment of the present disclosure, in the apparatus for bending a current breaking member of a battery pack, since the bending guide unit may press and fix the electrode lead so that a bending line for dividing a bent portion and a non-bent portion of the electrode lead of the battery cell, the bending portion of the electrode lead may be set uniformly.

Thus, the apparatus for bending a current breaking member of a battery pack may prevent defects such as electrical disconnection between the current breaking member and the electrode lead, and it is possible to manufacture a battery pack of uniform quality. Further, it is possible to prevent damage or explosion of the battery cell caused when the current breaking, member is not placed at a set position.

Also, according to this embodiment of the present disclosure, since the guide bar has an edge structure, the bending line may be precisely set on the electrode lead. In addition, the step structure of the guide bar may effectively prevent from contacting or colliding with the battery cell or the current breaking member.

Further, according to an embodiment of the present disclosure, since the placing jig may be located so that the current breaking member does not interfere with the placing jig using a recessed groove structure, it is possible to effectively reduce the case where the current breaking member is not placed at an accurate position on the support of the bending jig due to the interference with the placing jig, thereby effectively reducing a defect ratio.

In addition, according to an embodiment of the present disclosure, since the compression fixing unit of the present disclosure may compress the electrode lead to fix a state where the electrode lead is bent based on the bending line, the current breaking member may keep a state of being stably placed on the terrace portion.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
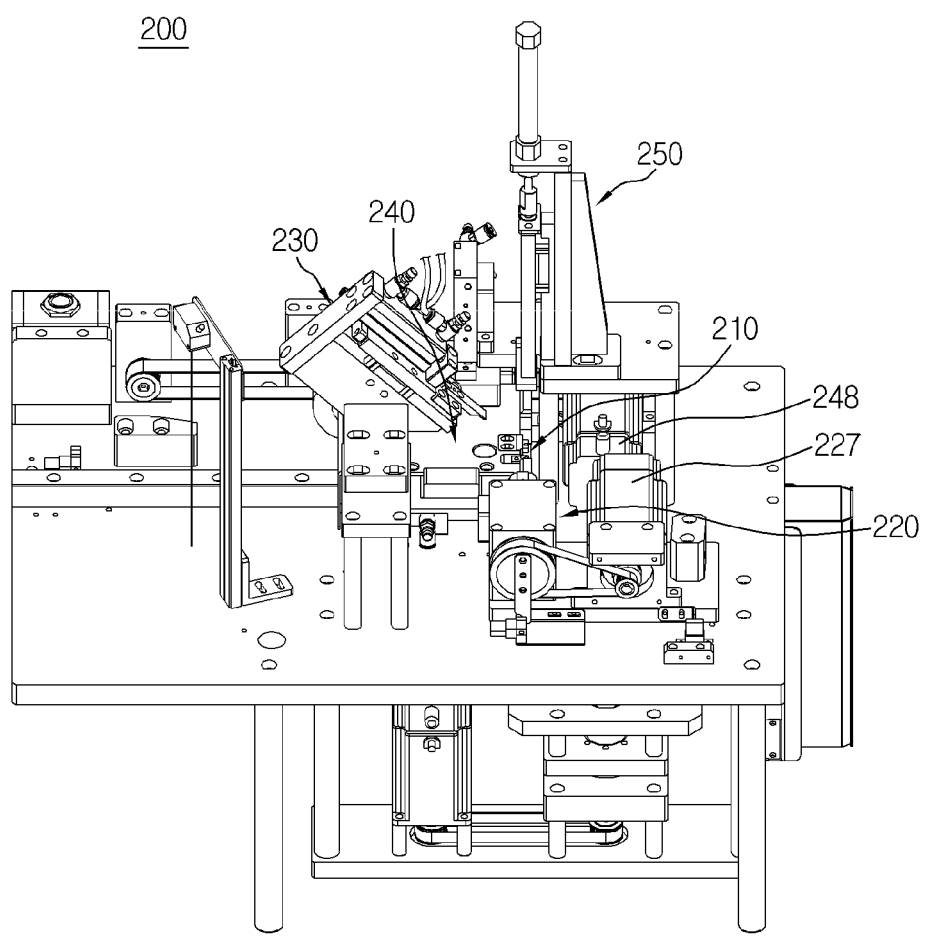
FIG. 1 is a perspective view schematically showing an apparatus for bending a current breaking member of a battery pack according to an embodiment of the present disclosure.
Figure 2:
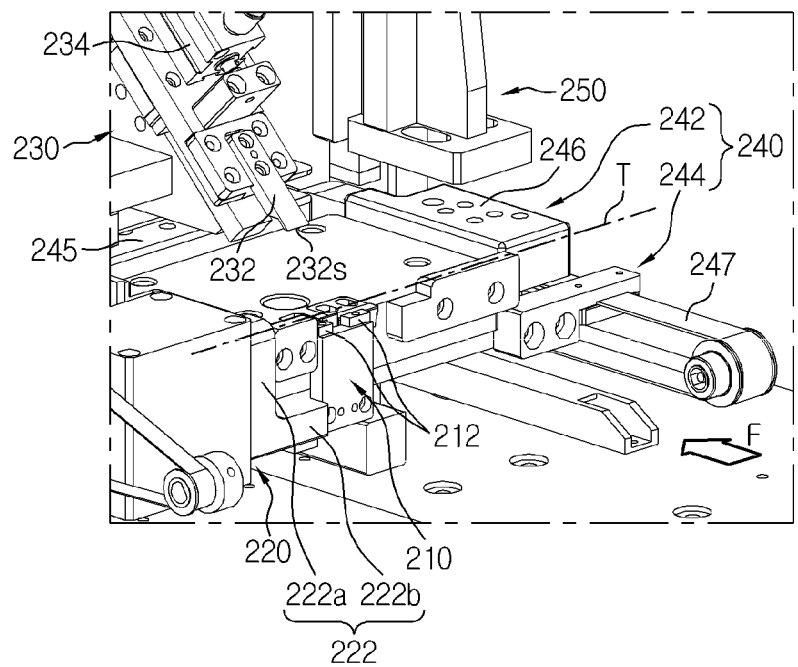
FIG. 2 is a perspective view some components of the apparatus for bending a current breaking member of a battery pack according to an embodiment of the present disclosure.
Figure 3:
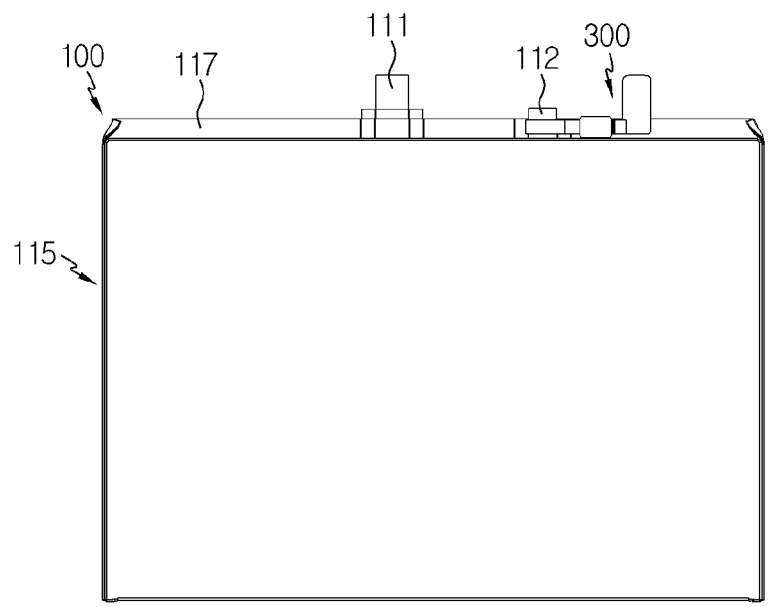
FIG. 3 is a plane view schematically showing a battery cell at which a current breaking member according to an embodiment of the present disclosure is installed.

FIG. 1 is a perspective view schematically showing an apparatus for bending a current breaking member of a battery pack according to an embodiment of the present disclosure. FIG. 2 is a perspective view some components of the apparatus for bending a current breaking member of a battery pack according to an embodiment of the present disclosure. In addition. FIG. 3 is a plane view schematically showing a battery cell at which a current breaking member according to an embodiment of the present disclosure is installed.

Referring to FIGS. 1 to 3, an apparatus 200 for bending a current breaking member of a battery pack according to the present disclosure includes a bending jig 210, a rotation driving unit 220, and a bending guide unit 230.

Here, the bending jig may have a support 212 on which a current breaking member 300 electrically connected to an electrode lead 112 of a battery cell 100 is placed. Accordingly, the current breaking member 300 placed on the support 212 may be placed on a portion of the battery cell 100 in a state where the bending jig 210 is rotated 180 degrees.

In addition, a portion of the rotation driving unit 220 may be connected to the bending jig 210 so that the bending jig 210 rotates about a rotation axis T. Specifically, the rotation driving unit 220 may be connected to a middle end or a lower end of the bending jig 210, preferably to the lower end of the bending jig 210. Further, the rotation driving unit 220 may have a rotation motor 227 for generating a rotating force.

Figure 4:
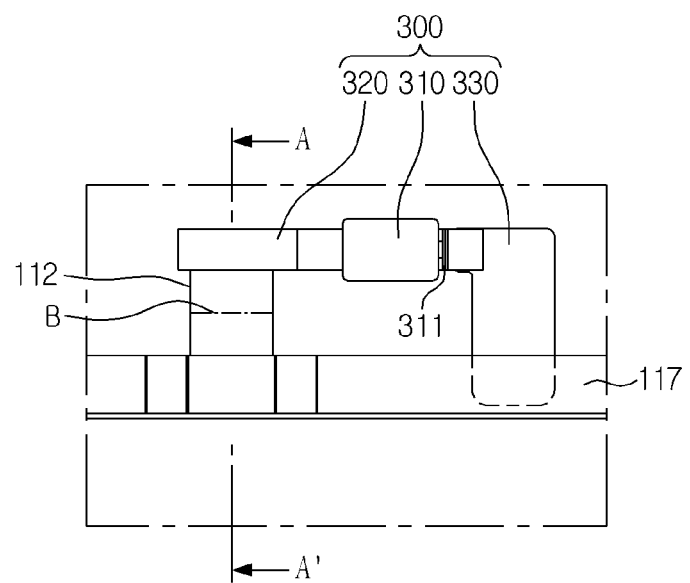
FIG. 4 is a plane view (a) schematically showing a process in which the current breaking member is placed on the battery cell according to an embodiment of the present disclosure and a cross-sectioned view (b), taken along the line A-K of the plane view (a).
Figure 4:
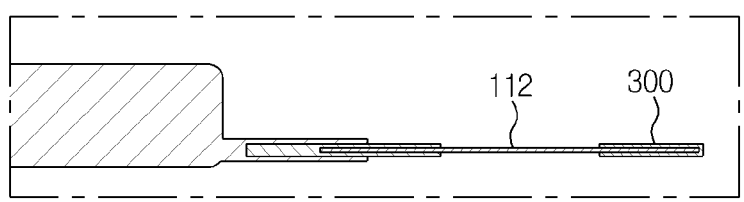
Figure 5:
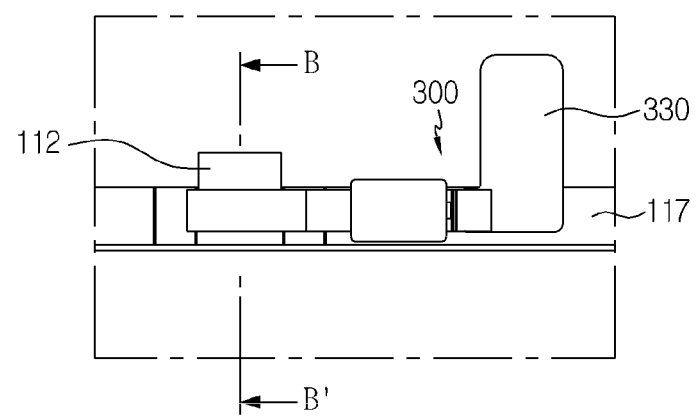
FIG. 5 is a plane view (a) schematically showing a process in which the current breaking member is placed on the battery cell according to an embodiment of the present disclosure and a cross-sectioned view (b), taken along the line B-B' of the plane view (a).
Figure 5:
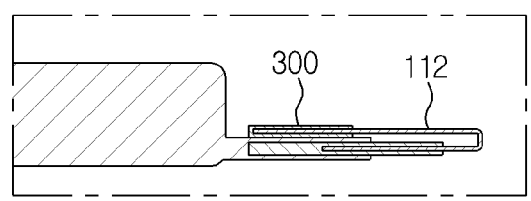

FIG. 4 is a plane view (a) schematically showing a process in which the current breaking member is placed on the battery cell according to an embodiment of the present disclosure and a cross-sectioned view (b), taken along the line A-A' of the plane view (a). In addition, FIG. 5 is a plane view (a) schematically showing a process in which the current breaking member is placed on the battery cell according to an embodiment of the present disclosure and a cross-sectioned view (b), taken along the line B-B' of the plane view (a).

Referring to FIGS. 1 to 5, the rotation driving unit 220 may rotate the bending jig 210 so that the current breaking member 300 is bent and rotated with reference to a bending line B of the electrode lead 112 to be placed on the upper surface of a terrace portion 117 of the battery cell 100.

In addition, the bending guide unit 230 may press and fix the electrode lead 112 so that the bending line B for dividing a bent portion and a non-bent portion of the electrode lead 112 of the battery cell 100 is set.

In other words, based on the bending line B, one side of the electrode lead 112 pressed and contacted by the bending guide unit 230 may be set as a non-bending portion, and the other side of the electrode lead 112 not pressed and contacted by the bending guide unit 230 may be set as a bending portion.

At this time, the electrode lead 112 may be a positive electrode lead or a negative electrode lead electrically connected to the current breaking member 300.

Thus, according to this configuration of the present disclosure, the position of the bending portion may be set to be constant in the process of bending the electrode lead by rotating the current breaking member 300 by 180 degrees with respect to the rotation axis T, and so it is possible to prevent the battery cell 100 from being damaged or exploded since current breaking member 300 is not placed at a set position. Further, it is possible to prevent defects such as electrical disconnection between the current breaking member 300 and the electrode lead 112, and a battery pack may be manufactured with uniform quality.

Referring to FIG. 3 again, the battery cell 100 may be a pouch-type battery cell 100. In particular, the pouch-type battery cell 100 may have an electrode assembly (not shown), an electrolyte (not shown) and a pouch exterior 115.

Here, the electrode assembly (not shown) may be configured such that at least one positive electrode plate and at least one negative electrode plate are disposed with a separator interposed therebetween. More specifically, the electrode assembly may be classified into a winding-type in which one positive electrode plate and one negative electrode plate are wound together with a separator, and a stacking-type in which a plurality of positive electrode plates and a plurality of negative electrode plates are alternately stacked with a separator interposed therebetween.

Also, the pouch exterior 115 may be configured to include an outer insulating layer, a metal layer, and an inner adhesive layer. The pouch exterior 115 is made of a metal thin film, for example an aluminum thin film, in order to protect the internal components such as the electrode assembly and the electrolyte and to complement the electrochemical properties of the electrode assembly and the electrolyte and improve the heat-dissipating property.

In addition, the aluminum thin film may be interposed between insulating layers made of an insulating material so as to ensure electrical insulation between internal components of the battery cell 110 such as the electrode assembly and the electrolyte and other components outside the battery cell 100.

Further, the pouch exterior 115 may include two pouches, at least one of which may have a concave inner space. Also, the electrode assembly may be accommodated in the inner space of the pouch. In addition, the outer circumferences of the two pouches may be welded to each other to be sealed so that the accommodated space containing the electrode assembly may be sealed. For example, as shown in FIG. 3, a terrace portion 117 that is sealed may be formed at the outer circumference of the front side of the pouch exterior 115.

Further, each pouch-type battery cell 100 may include electrode leads 111, 112, and the electrode leads 111, 112 may include a positive electrode lead 111 and a negative electrode lead 112. Here, each electrode lead 111, 112 has a plate shape at which two broad surfaces are respectively located at upper and lower portions.

In addition, the electrode leads 111, 112 may be configured to protrude forward or rearward from the terrace portion 117 located at the outer circumference of the front or rear side of the pouch exterior 115. That is, the electrode leads 111, 112 may be drawn out of the pouch exterior 115 through the terrace portion 117 located at the outer circumference of the front side of the pouch exterior 115.

For example, as shown in FIG. 3, one electrode lead 111 may be configured to protrude from one side of one side surface of the terrace portion 117 of the battery cell 100, and the other electrode lead 112 may be spaced apart from one electrode lead 111 and protrude from the other side of one side surface of the terrace portion 117.

The configuration of the pouch-type battery cell 100 described above is obvious to those skilled in the art and thus is not be described in detail. In addition, in an apparatus 200 for bending a current breaking member of a battery pack according to the present disclosure, various kinds of battery cells known at the time of filing of this application may be employed.

Referring to FIGS. 4 and 5 along with FIG. 3, the battery cell 100 may include a current breaking member 300 welded and coupled to the electrode lead 112.

Specifically, the current breaking member 300 may include a current breaking element 310, a connection 311, a first connection member 320, and a second connection member 330.

Both sides of the current breaking element 310 are electrically coupled to the first connection member 320 and the second connection member 330, respectively.

Also, the first connection member 320 may be coupled to be electrically connected to the electrode lead 112 of the battery cell 100. In addition, the second connection member 330 may be electrically connected to another component of the battery pack (not shown). For example, the second connection member 330 may be electrically connected to a protective circuit module (not shown) or an external electrode terminal (not shown) of the battery pack.

In addition, as shown in the plane view (a) and the cross-sectional view (b) of FIG. 4, the current breaking member 300 may be positioned to protrude from the outer circumference of the battery cell 100. Further, one end of the first connection member 320 may be connected and coupled to the current breaking element 310, and a portion of the first connection member 320 may be coupled to the electrode lead 112.

In addition, as shown in the plane view (a) and the cross-sectional view (b) of FIG. 5, the current breaking member 300 is rotated by 180 degrees based on the bending line B by the apparatus 200 for bending a current breaking member of a battery pack according to the present disclosure, and then placed on the terrace portion 117 of the battery cell 100.

Figure 6:
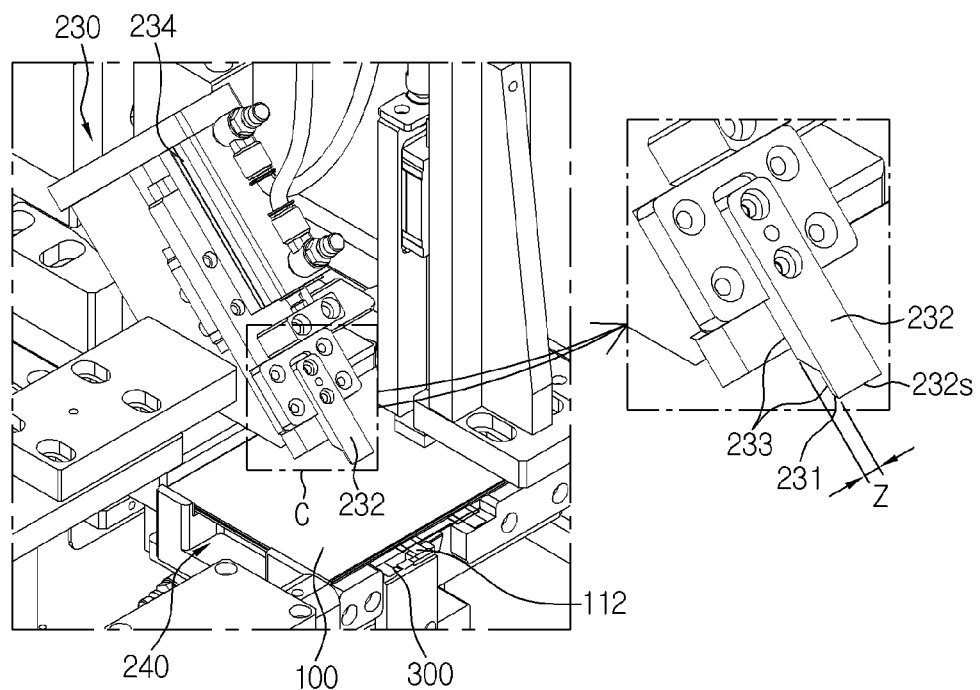
FIG. 6 is a perspective view schematically showing some components of the apparatus for bending a current breaking member of a battery pack according to an embodiment of the present disclosure and a partially enlarged view showing, a portion C of the perspective view.
Figure 7:
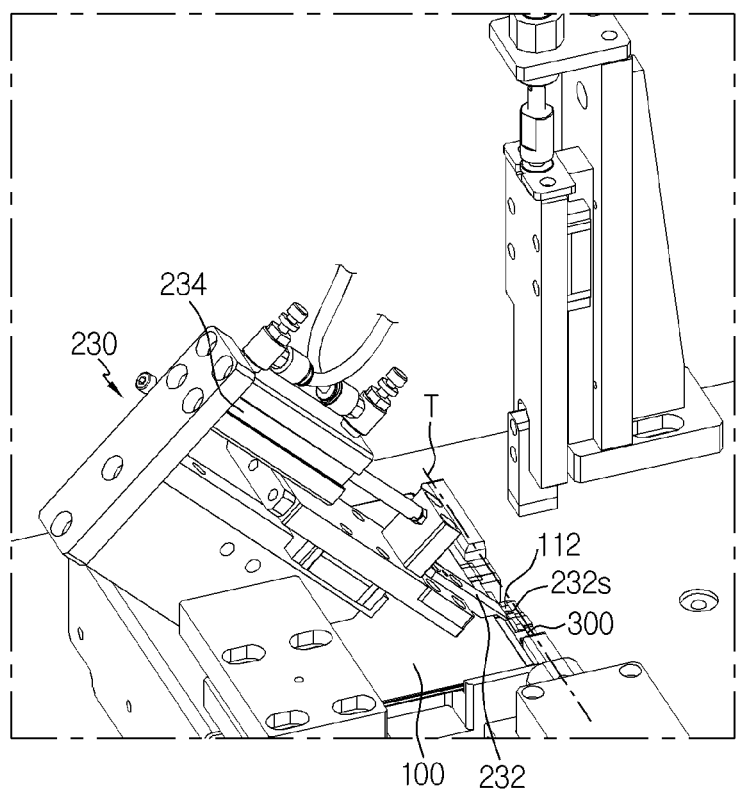
FIG. 7 is a perspective view schematically showing that a guide bar of the bending guide unit is carried with respect to the apparatus for bending, a current breaking member of a battery pack according to an embodiment of the present disclosure.

FIG. 6 is a perspective view schematically showing some components of the apparatus for bending a current breaking member of a battery pack according to an embodiment of the present disclosure and a partially enlarged view showing a portion C of the perspective view. In addition, FIG. 7 is a perspective view schematically showing that a guide bar of the bending guide unit is carried with respect to the apparatus for bending a current breaking member of a battery pack according to an embodiment of the present disclosure.

Referring to FIGS. 4 to 7 together, the bending guide unit 230 may include a guide bar 232 configured such that one end thereof presses the electrode leads 111, 112 to set the bending line B.

Also, the guide bar 232 may have a shape whose thickness Z gradually decreases toward one end thereof. Further, the guide bar 232 may have a step structure by which the thickness Z is reduced stepwise toward one end thereof so that a lower surface 233 thereof has different heights.

In addition, one end of the guide bar 232 may have one side surface 231 to contact and press the surface of the electrode lead 112. Specifically, an edge structure 232s protruding in one direction may be formed on one side surface of the guide bar 232.

Moreover, the edge structure 232s may be oriented such that its edge is parallel to the longitudinal direction of the rotation axis T. Also, the length of the edge structure 232s may be longer than the set bending line B.

Thus, according to this configuration of the present disclosure, the guide bar 232 may precisely set the bending line B on the electrode lead 112 using the edge structure 232s, and also the step structure of the guide bar 232 may effectively prevent the contact or collision with the current breaking member 300.

Further, the bending guide unit 230 may have a guide carrying device 234 configured to carry the guide bar 232.

Specifically, the guide carrying device 234 may carry the guide bar 232 so that one end of the guide bar 232 presses and fixes the electrode leads 111, 112. At this time, the guide carrying device 234 may be configured such that one end of the guide bar 232 approaches the surface of the electrode leads 111, 112 in a diagonal direction. For example, as in FIG. 7, the approaching direction of the guide bar 232 may be 45 degrees with respect to the surface of the electrode lead 112.

Thus, according to this configuration of the present application, since the guide carrying device 234 carries the guide bar 232 to approach the surface of the electrode lead 112 in a diagonal direction, the guide bar 232 may reduce the interference between the guide bar 232 and the battery cell 100 or the bending jig 210.

In addition, the guide carrying device 234 may carry the guide bar 232 back to return to its original position. That is, the guide bar 232 may be returned to its original position by the guide carrying device 234 before the bending jig 210 rotates 180 degrees to complete the bending process.

Further, the guide carrying device 234 may include a hydraulic device (not shown) for transmitting power using the pressure of a fluid in order to carry the guide bar 232. Accordingly, the guide carrying device 234 may finely adjust the force that the guide bar 232 presses the upper surface of the electrode lead 112, thereby preventing the electrode lead 112 from being damaged or collapsed by the guide bar.

Referring to FIG. 2 again, the rotation driving unit 220 may include a rotation bar 222.

Specifically, the rotation bar 222 may be connected to the rotation motor 227 (FIG. 1) to transmit the rotating force generated by the rotation motor 227 to the bending jig 210. In addition, the rotation bar 222 may have a main body 222a extending from the rotation axis T in a direction along which a centrifugal force acts. The main body 222a may be connected to a shaft (not shown) connected to the rotation motor 227 so that the rotating force of the rotation motor 227 is transmitted.

In addition, the rotation bar 222 may have a bent extension 222b bent and extended from the end extending in the direction along which the centrifugal force of the main body 222a acts, in the longitudinal direction of the rotation axis T. Further, a portion of the bent extension 222b and a lower portion of the bending jig 210 may be coupled to each other.

Specifically, the bent extension 222b may have a step formed at one end thereof so that the thickness in the front and rear direction or the thickness in the left and right direction is decreased when being viewed in the F direction. For example, as in FIG. 2, one end of the bent extension 222b may have a thin thickness in the front and rear direction to form the step, and the outer surface of the step may be connected and coupled to the lower portion of the bending jig 210.

Here, terms indicating directions such as "front", "rear" "up", "down", "right" and "left" may be changed depending on the position of an observer or the position of a target to be observed. However, for convenience of explanation, terms indicating directions such as "front", "rear" "up", "down", "right" and "left" will be expressed based on the observation in the F direction.

Figure 8:
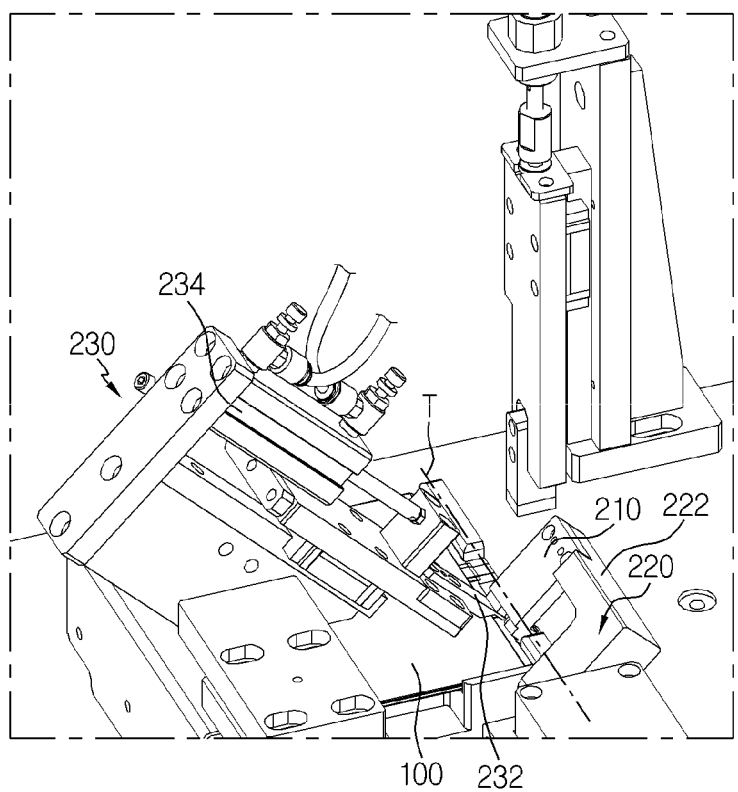
FIGS. 8 and 9 are partially enlarged perspective views schematically showing that a bending jig of the apparatus for bending a current breaking member of a battery pack according to an embodiment of the present disclosure bends the current breaking member.
Figure 9:
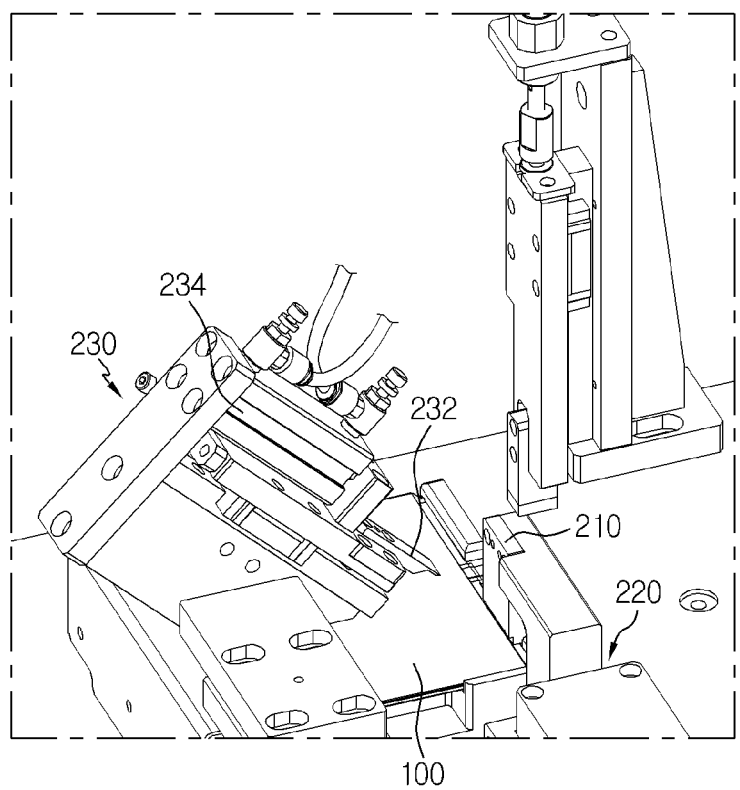

FIGS. 8 and 9 are partially enlarged perspective views schematically showing that a bending jig of the apparatus for bending a current breaking member of a battery pack according to an embodiment of the present disclosure bends the current breaking member.

Referring to FIGS. 8 and 9, the rotation driving unit 220 may primarily rotate the bending jig 210 at a partial angle of 180 degrees in total, about the rotation axis T by using the rotation bar 222. At this time, the guide bar 232 may be carried back to return to its original position by the guide carrying device 234. For example, as shown in FIG. 8, the rotation driving unit 220 may primarily rotate the bending jig 210 at a 45 degree angle.

In addition, the rotation driving unit 220 may secondarily rotate the bending jig 210 at the remaining angle by using the rotation bar 222 after the guide bar 232 is returned. For example, as shown in FIG. 9, the rotation driving unit 220 may secondarily rotate the bending jig 210 at a 135 degree angle.

Thus, according to this configuration of the present disclosure, since the rotation driving unit 220 primarily rotates the bending jig at a certain angle of 180 degrees and then secondarily rotates the bending jig 210 at the remaining angle, the guide bar 232 may be returned between the primary rotation and the secondary rotation, and thus it is possible to avoid that the bending jig 210 interferes with the guide bar 232. Thus, it is possible to prevent an accident caused by a collision between the guide bar 232 and the bending jig 210 in advance.

Figure 10:
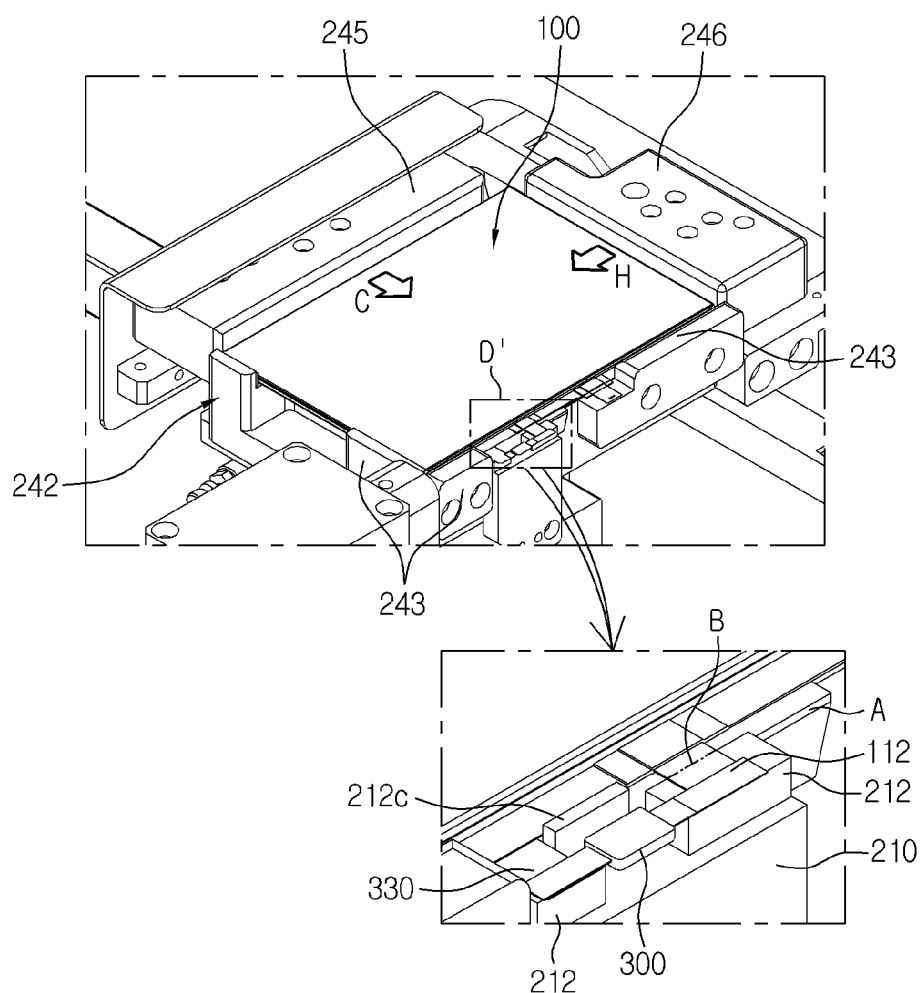
FIG. 10 is a perspective view schematically showing some components of the apparatus for bending a current breaking member of a battery pack and a partially enlarged perspective view schematically showing a portion D' of the perspective view.

FIG. 10 is a perspective view schematically showing some components of the apparatus for bending a current breaking member of a battery pack and a partially enlarged perspective view schematically showing a portion D of the perspective view. In addition, FIG. 11 is a partially enlarged perspective view schematically showing some components of the apparatus for bending a current breaking member of a battery pack according to an embodiment of the present disclosure.

Figure 11:
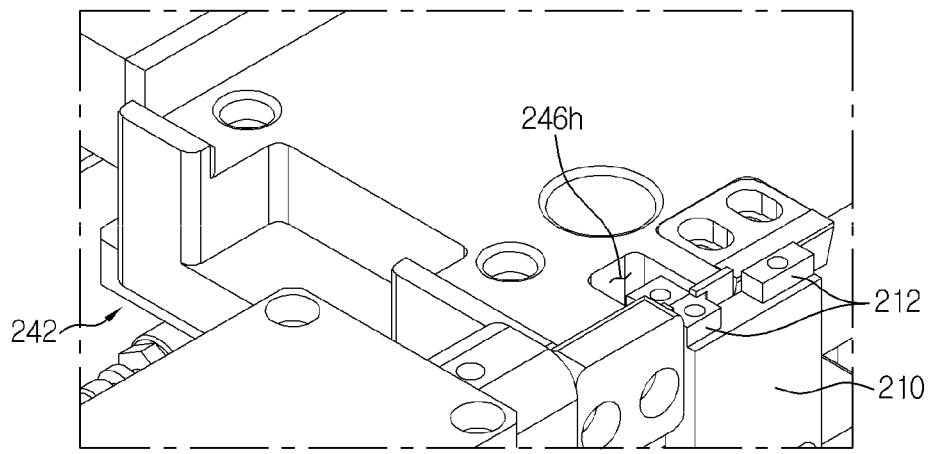
FIG. 11 is a partially enlarged perspective view schematically showing some components of the apparatus for bending a current breaking member of a battery pack according to an embodiment of the present disclosure.

Here, in FIG. 11, the battery cell 100 and the current breaking member 300 are not depicted to help understanding of the following description.

Referring to FIGS. 10 and 11 along with FIGS. 1 and 2, the current breaking member 300 for a battery pack may further include a battery cell supply unit 240.

Specifically, the battery cell supply unit 240 may include a placing jig 242 and a jig carrying device 244 (FIG. 2).

Here, the placing jig 242 may have a sidewall 243 to allow the battery cell 100 to be stably mounted to an upper portion thereof.

In addition, the placing jig 242 may include at least one alignment block 245, 246.

Here, the alignment blocks 245, 246 may be configured to move in the left and right direction or in the front and rear directions to press the side surface of the placed battery cell 100 so that the battery cell 100 is aliened to a given position.

For example, as shown in FIG. 10, the placing jig 242 may include a first alignment block 245 configured to move in the front and rear direction C to press the side surface of the battery cell 100 in the front and rear direction C, and a second alignment block 246 configured to move in the left and right direction H to press the side surface of the battery cell 100 in the left and right direction H.

Thus, according to this configuration of the present disclosure, since the placing jig 242 may place the battery cell 100 at a right place using the first alignment block 245 and the second alignment block 246, the current breaking member 300 may be accurately placed at a set position in the terrace portion 117 of the battery cell 100, thereby enhancing the uniform product quality and effectively reducing the defect rate.

Moreover, the battery cell 100 may be placed on the placing jig 242 such that a portion of the current breaking member 300 protrudes out of the outer circumference A of the placing jig 242. In other words, a portion of the current breaking member 300 may protrude outward beyond the outer circumference A of the placing jig 242 to be located on the support 212 of the bending jig 210.

Further, the second connection member 330 of the current breaking member 300 may be located to protrude toward the main body of the battery cell 100 before being bent. To this end, the placing jig 242 of the battery cell supply unit 240 may have a recessed groove 246h having a concave structure so that the second connection member 330 of the current breaking member 300 may be inserted therein.

Thus, according to this configuration of the present disclosure, due to the recessed groove 246h of the placing jig 242, the current breaking, member 300 which is not bent may be located without interfering with the placing jig 242. Accordingly, it is possible to effectively reduce the case where the current breaking member 300 is not properly located on the support 212 of the bending jig 210 due to interference with the placing jig 242, thereby effectively reducing the defect rate.

Referring to FIGS. 1 and 2 again, the jig carrying device 244 may be configured to carry the placing jig 242 such that the current breaking member 300 is located on the support 212 of the bending jig 210. The jig carrying device 244 may be a conveying device using, for example, a belt 247 and a rotation motor 248 connected to the belt 247.

Figure 12:
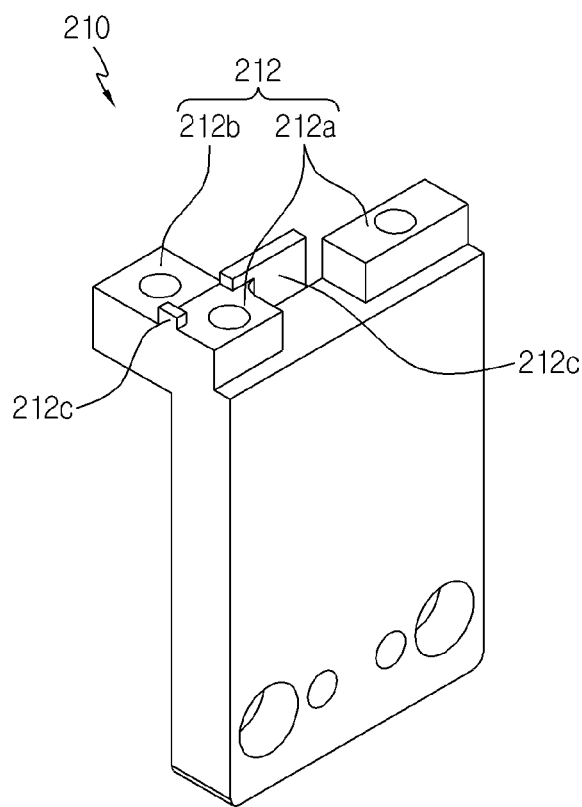
FIG. 12 is a perspective view schematically showing a bending jig for the apparatus for bending a current breaking member of a battery pack according to an embodiment of the present disclosure.

FIG. 12 is a perspective view schematically showing a bending jig for the apparatus for bending a current breaking member of a battery pack according to an embodiment of the present disclosure.

Referring to FIG. 12 along with FIG. 10 the support 212 of the bending jig 210 may include a supporting portion 212a formed by ridging upward from the upper surface of the bending jig 210, and a protruding portion 212b formed by protruding a portion of the supporting portion 212a toward the battery cell 100.

Further, the protruding portion 212b may be configured such that the second connection member 330 of the current breaking member 300 is placed on the upper surface thereof. To this end, the protruding portion 212b may be positioned to be inserted into the recessed groove 246h.

In addition, a barrier 212c extending upward may be formed on the supporting portion 212a. For example, as in FIG. 12, two barriers 212c may be formed on the supporting portion 212a of the support 212. Further, the second connection member 330 of the current breaking member 300 may be interposed between the barriers 212c.

Thus, according to this configuration of the present disclosure, the support 212 of the bending jig 210 is formed to support the lower surface of the current breaking member 300 and prevent the current breaking member 300 from being deviated from the support 212. Thus, the current breaking member 300 may keep stably placed on the support 212 while the bending jig 210 is rotating, and the current breaking member 300 may be accurately placed on the terrace portion 117.

Figure 13:
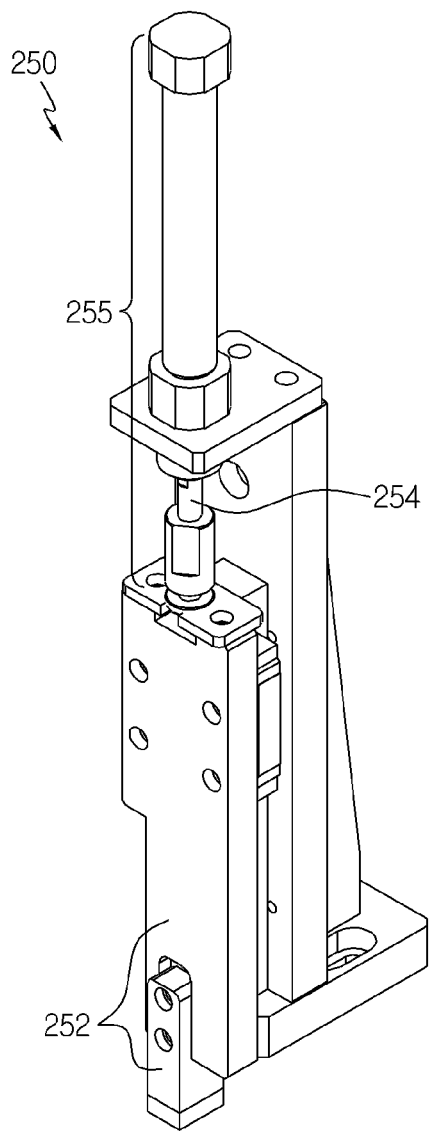
FIG. 13 is a perspective view schematically showing a compression fixing unit for the apparatus for bending a current breaking member of a battery pack according to an embodiment of the present disclosure.

FIG. 13 is a perspective view schematically showing a compression fixing unit for the apparatus for bending a current breaking member of a battery pack according to an embodiment of the present disclosure. In addition, FIG. 14 is a partially enlarged perspective view schematically showing that the compression fixing unit of the apparatus for bending a current breaking member of a battery pack according to an embodiment of the present disclosure compresses the bent electrode lead.

Figure 14:
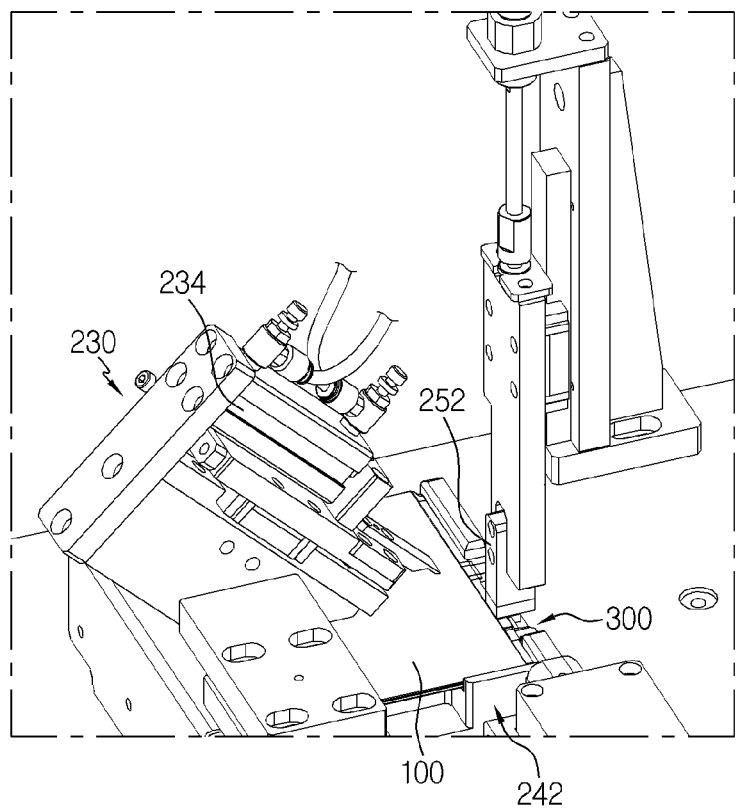
FIG. 14 is a partially enlarged perspective view schematically showing that the compression fixing unit of the apparatus for bending a current breaking member of a battery pack according to an embodiment of the present disclosure compresses the bent electrode lead.

Referring to FIGS. 13 and 14 along with FIGS. 4 and 5, the apparatus for bending a current breaking member 300 of a battery pack may include a compression fixing unit 250.

In addition, the compression fixing unit 250 may include a pressing block 252 for compressing the bent electrode lead 112 (FIG. 5) and a pressing carrying device 255 configured to carry the pressing block 252.

Specifically, the pressing block 252 may have one end surface formed to compress the bent electrode lead 112 along the bending line B.

Also, the pressing carrying device 255 may include a carrying bar 254 such that the pressing block 252 presses the upper surface of the bent electrode lead 112 and then returns to its original position again.

In addition, the carrying bar 254 may be connected to the pressing block 252, and the pressing block 252 may move up and down along the outer surface of the carrying bar 254.

That is, as shown in FIGS. 13 and 14, the pressing carrying device 255 may move the pressing block 252 downward to press the upper surface of the bent electrode lead 112. Moreover, the pressing carrying device 255 may move the pressing block 252 upward along the carrying bar 254 to return to its original position if the electrode lead 112 is completely compressed and fixed.

Thus, according to this configuration of the present disclosure, the pressing carrying device 255 may compress the electrode lead 112 so that the electrode lead is fixed in a bent state with respect to the bending line, and thus may help the current breaking member to keep stably placed on the terrace portion.

Meanwhile, a method of manufacturing a battery pack (not shown) (hereinafter, also referred to as a 'manufacturing method') according to the present disclosure may use the apparatus 200 for bending a current breaking member of a battery pack (FIG. 1) according to the present disclosure.

As shown in FIGS. 2 and 10, the manufacturing method according to the present disclosure may include a step (a) of, by the battery cell supply unit 240, carrying and supplying the battery cell 100 such that the current breaking member 300 is located on the support 212 of the bending jig 210.

Also, as shown in FIG. 7, the manufacturing method according to the present disclosure may include a step (b) of, by the bending guide unit 230, pressing and fixing the upper surface of the electrode lead 112 such that the bending line B (FIG. 4) is set on the electrode lead 112 connected to the current breaking member 300.

In addition, referring to FIGS. 8 to 10, the manufacturing method according to the present disclosure may include a step (c) of, by the rotation driving unit 220, rotating the bending jig 210 about the rotation axis T so that the current breaking member 300 placed on the support 212 is rotated.

Specifically, as in FIG. 8, the bending jig 210 may be primarily rotated by a partial angle of 180 degrees in total based on the rotation axis T, and, as in FIG. 9, may be secondarily rotated by the remaining angle after the guide bar 232 of the bending guide unit 230 returns to its original position.

Further, referring to the plane view (a) of FIG. 5 along with FIG. 14, the manufacturing method according to the present disclosure may include a step (d) of, by the compression fixing unit 250, compressing the bent electrode lead 112 downward.

Meanwhile, even though terms indicating directions such as "up", "down", "right", "left", "front" and "rear" are used in this specification, it will be apparent to those skilled in the art that these terms are only for convenience of explanation and may vary depending on the position of a target to be observed or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 200: apparatus for bending a current breaking member of a battery pack | |
| 230: bending guide unit | |
| 100: battery cell | 232: guide bar |
| 111, 112: electrode lead | 232s: edge structure |
| B: bending line | 234: guide carrying device |
| 117: terrace portion | 240: battery cell supply unit |
| 300: current breaking member | 242: placing jig |
| 210: bending jig | 245, 246: alignment block |
| 212: support | 244: jig carrying device |
| 220: rotation driving unit | 246: recessed groove |
| 222: rotation bar | 250: compression fixing unit |
| T: rotation axis | 252: pressing block |
| 254: pressing carrying device | |

INDUSTRIAL APPLICABILITY

The present disclosure relates to an apparatus for bending a current breaking member of a battery pack, which is used for manufacturing a battery pack. In addition, the present disclosure may be applied to industries related to electronic devices having a battery pack, which is manufactured using the apparatus for bending a current breaking member of a battery pack.

What is claimed is:

1. An apparatus for bending a current breaking member of a battery pack, the apparatus comprising:
a bending jig having a support configured so that a current breaking member electrically connected to an electrode lead of a battery cell is placed thereon;
a rotation driving unit having a rotation bar connected to one end of the support of the bending jig so that the support of the bending jig rotates based on a rotation axis thereof; and
a bending guide unit configured to press and fix the electrode lead so that a bending line dividing a bent portion and a non-bent portion of the electrode lead of the battery cell is set,
wherein the rotation driving unit primarily rotates the support of the bending jig by a partial angle of 180 degrees in total based on the rotation axis and secondarily rotates the support of the bending jig by a remaining angle thereof.

2. The apparatus for bending a current breaking member of a battery pack according to claim 1,
wherein the bending guide unit includes a guide bar having one end configured to press and fix the electrode lead to set the bending line, and
wherein an edge structure oriented in parallel to the rotation axis is formed at the one end of the guide bar.

3. The apparatus for bending a current breaking member of a battery pack according to claim 2,
wherein the bending guide unit includes a guide carrying device for carrying the guide bar so that the one end of the guide bar presses and fixes the electrode lead, and
wherein the guide carrying device is configured so that the one end of the guide bar approaches a surface of the electrode lead in a diagonal direction.

4. An apparatus for bending a current breaking member of a battery pack, the apparatus comprising:
a bending jig having a support configured so that a current breaking member electrically connected to an electrode lead of a battery cell is placed thereon;
a rotation driving unit having a portion connected to the bending jig so that the bending jig rotates based on a rotation axis thereof; and
a bending guide unit configured to press and fix the electrode lead so that a bending line dividing a bent portion and a non-bent portion of the electrode lead of the battery cell is set,
wherein the rotation driving unit rotates the bending jig so that the current breaking member is bent and rotated based on the bending line of the electrode lead and then placed on an upper surface of a terrace portion of the battery cell.

5. The apparatus for bending a current breaking member of a battery pack according to claim 4,
wherein the rotation driving unit primarily rotates the bending jig by a partial angle of 180 degrees in total based on the rotation axis and secondarily rotates the bending jig by a remaining angle thereof.

6. The apparatus for bending a current breaking member of a battery pack according to claim 5,
wherein the rotation driving unit includes a rotation bar connected to a rotary shaft to transmit a rotating force to the bending jig,
wherein the rotation bar includes a main body formed to extend from the rotary shaft in a direction along which a centrifugal force is applied and a bent extension bent from an extending end of the main body and extending in a longitudinal direction of the rotary shaft, and
wherein a portion of the bent extension and a lower portion of the bending jig are coupled to each other.

7. An apparatus for bending a current breaking member of a battery pack, the apparatus comprising:
a bending jig having a support configured so that a current breaking member electrically connected to an electrode lead of a battery cell is placed thereon;
a rotation driving unit having a portion connected to the bending jig so that the bending jig rotates based on a rotation axis thereof;
a bending guide unit configured to press and fix the electrode lead so that a bending line dividing a bent portion and a non-bent portion of the electrode lead of the battery cell is set,
a battery cell supply unit having a placing jig on which the battery cell is mounted and a jig carrying device for carrying the placing jig so that the current breaking member is located on the support of the bending jig; and a compression fixing unit having a pressing block configured to compress the electrode lead bent along the bending line.

8. The apparatus for bending a current breaking member of a battery pack according to claim 7, wherein the placing jig has at least one alignment block formed to press a side surface of the placed battery cell so that the battery cell is aligned to a given location.

9. The apparatus for bending a current breaking member of a battery pack according to claim 8, wherein the battery cell is placed on the placing jig so that a portion of the current breaking member protrudes out of an outer circumference of the placing jig.

10. The apparatus for bending a current breaking member of a battery pack according to claim 7, wherein the placing jig of the battery cell supply unit includes a recessed groove having an inwardly concave structure so that a portion of the current breaking member is inserted therein.

11. The apparatus for bending a current breaking member of a battery pack according to claim 10, wherein the support of the bending jig includes:

a supporting portion formed to ridge upward from an upper surface of the bending jig; and a protruding portion formed by protruding a portion of the supporting portion, wherein the protruding portion is located to be inserted into the recessed groove.

12. The apparatus for bending a current breaking member of a battery pack according to claim 7, wherein the compression fixing unit includes a pressing carrying device configured so that the pressing block presses an upper surface of the bent electrode lead and returns to an original position.

13. A method for manufacturing a battery pack by using the apparatus for bending a current breaking member of a battery pack according to claim 7, the method comprising:

by the battery cell supply unit, carrying and supplying a battery cell so that the current breaking member is located on the support of the bending jig;

by the bending guide unit, pressing and fixing an upper surface of the electrode lead so that a bending line is set on the electrode lead connected to the current breaking member;

by the rotation driving unit, rotating the bending jig based on the rotation axis so that the current breaking member placed on the support is rotated; and by the compression fixing unit, compressing the bent electrode lead downward.

14. The method for manufacturing a battery pack according to claim 13, wherein in the rotating of the bending jig, the bending jig is primarily rotated by a partial angle of 180 degrees in total based on the rotation axis and then secondarily rotated by a remaining angle thereof after the bending guide unit returns to an original position.

* * * * *